United States Patent
Balea (10) Patent No.: US 11,268,419 B2
(45) Date of Patent: Mar. 8, 2022

(54) FILTER ASSEMBLY FOR REDUCTANT STORAGE SYSTEM

(71) Applicant: Caterpillar Inc., Peoria, IL (US)

(72) Inventor: Bogdan Balea, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 230 days.

(21) Appl. No.: 16/543,269

(22) Filed: Aug. 16, 2019

(65) Prior Publication Data

US 2021/0047956 A1 Feb. 18, 2021

(51) Int. Cl.
| | | |
|---|---|---|
| *C02F 1/00* | (2006.01) | |
| *F01N 3/20* | (2006.01) | |
| *B01D 29/90* | (2006.01) | |
| *B01D 35/027* | (2006.01) | |
| *B01D 35/18* | (2006.01) | |
| *B01D 35/30* | (2006.01) | |

(52) U.S. Cl.
CPC ............ *F01N 3/2066* (2013.01); *B01D 29/90* (2013.01); *B01D 35/0276* (2013.01); *B01D 35/18* (2013.01); *B01D 35/306* (2013.01); *B01D 2201/342* (2013.01); *F01N 2610/02* (2013.01); *F01N 2610/10* (2013.01); *F01N 2610/1406* (2013.01); *F01N 2610/1426* (2013.01)

(58) Field of Classification Search
CPC .. B01D 35/0276; B01D 35/18; B01D 35/305; B01D 2201/342; F01N 2610/1406; F01N 2610/1426
USPC ...................................................... 210/172.1
See application file for complete search history.

(56) References Cited

U.S. PATENT DOCUMENTS

| | | | | |
|---|---|---|---|---|
| 3,680,285 | A * | 8/1972 | Wellan | B01D 46/0068 |
| | | | | 55/302 |
| 4,293,111 | A * | 10/1981 | Henri | B01D 46/06 |
| | | | | 248/95 |
| 4,545,833 | A * | 10/1985 | Tatara | B01D 29/27 |
| | | | | 156/93 |
| 6,839,508 | B2 * | 1/2005 | Biess | F02M 37/0058 |
| | | | | 392/462 |
| 7,943,101 | B2 | 5/2011 | Osaku et al. | |
| 9,248,390 | B2 | 2/2016 | Hudgens et al. | |
| 2014/0026990 | A1 * | 1/2014 | Delihas | F01N 3/035 |
| | | | | 137/558 |
| 2015/0196862 | A1 * | 7/2015 | Cassidy | B01D 35/0276 |
| | | | | 55/372 |
| 2015/0198071 | A1 * | 7/2015 | Hudgens | B01D 35/0276 |
| | | | | 210/805 |

(Continued)

FOREIGN PATENT DOCUMENTS

WO 2017120040 7/2017

*Primary Examiner* — Jason D Shanske
(74) *Attorney, Agent, or Firm* — Bookoff McAndrews PLLC (57) ABSTRACT

A reductant storage system for an internal combustion engine system includes a storage container having a bottom wall, a top wall opposite the bottom wall, an opening extending through the top wall, and a reservoir formed by a hollow interior of the storage container and a filter assembly. The filter assembly extends through the opening and include a filtering material and a gasket integrally formed with the filtering material. The gasket includes a proximal flange that is larger than the opening and including a sealing surface in sealing contact with the storage container.

19 Claims, 5 Drawing Sheets

(56) References Cited

U.S. PATENT DOCUMENTS

| | | | |
|---|---|---|---|
| 2015/0265953 A1* | 9/2015 | Morris | B01D 27/103 |
| | | | 210/136 |
| 2017/0122170 A1* | 5/2017 | Fahrenkrug | B01D 35/0276 |
| 2017/0189837 A1 | 7/2017 | Herold et al. | |
| 2018/0243667 A1* | 8/2018 | Ha | F01N 3/28 |
| 2020/0391142 A1* | 12/2020 | Immel | B01D 35/306 |

* cited by examiner

FILTER ASSEMBLY FOR REDUCTANT STORAGE SYSTEM

TECHNICAL FIELD

The present disclosure relates generally to internal combustion engine systems, and more particularly, to a filter assembly for a reductant storage system used in an engine aftertreatment system.

BACKGROUND

Internal combustion engines are useful in various applications, including mobile machines and power generation. Internal combustion engines are commonly used in conjunction with one or more aftertreatment devices that receive exhaust from the engine and reduce an amount of undesired emissions such as nitrogen oxides (NOx). One exemplary aftertreatment device is a Selective Catalytic Reduction (SCR) device or SCR catalyst. SCR catalysts may react with NOx to produce nitrogen and water. However, this reaction also requires the presence of a reductant in the SCR catalyst. A storage system may be provided in communication with an aftertreatment system to supply a reductant-containing fluid, which may be referred to as diesel exhaust fluid (DEF), to the SCR catalyst. This fluid may contain urea that, when heated, produces a reductant (ammonia) that allows the SCR catalyst to react with NOx.

Various devices have been used to store DEF for delivery to an aftertreatment device. In order to protect various components of the DEF storage or delivery devices, the DEF storage device may be provided with one or more filters. For example, some DEF storage devices include a filter provided within a filling port. While filters provided in a filling port may prevent the introduction of contaminants during filling of the storage device, they may not address the introduction of contaminants via other locations. Additionally, the placement of a filter in a filling opening may reduce the rate at which DEF may be filled into the storage device.

An exemplary reducing agent container is disclosed in U.S. Pat. No. 7,943,101 B2 (the '101 patent) to Osaku. The container disclosed in the '101 patent includes an upper opening which is sealed with a cover or canopy. A heat exchanger connected to the cover extends within an interior of the container. The canopy in the '101 patent is fastened to an opening on the upper face of the container, and includes an inlet, and outlet, and a supply port.

While the reducing agent container described in the '101 patent may be useful in some circumstances, it may tend to allow dirt and debris to accumulate within the container, for example, through the canopy or a filling port. This dirt and other debris may reduce the efficacy of the liquid reducing agent, and may cause wear or damage to sensors, or to an injection system for supplying liquid reducing agent to the SCR catalyst. For example, contamination that enters the container may travel with the fluid to an injection device, where it may accumulate and reduce the amount of injected fluid, or even create a blockage in the injector The disclosed filter assembly and system may solve one or more of the problems set forth above and/or other problems in the art. The scope of the current disclosure, however, is defined by the attached claims, and not by the ability to solve any specific problem.

SUMMARY

In one aspect, a reductant storage system for an internal combustion engine system may include a storage container having a bottom wall, a top wall opposite the bottom wall, an opening extending through the top wall, and a reservoir formed by a hollow interior of the storage container and a filter assembly. The filter assembly may extend through the opening and include a filtering material and a gasket integrally formed with the filtering material. The gasket may include a proximal flange that has a diameter that is larger than the opening and including a sealing surface in sealing contact with the storage container. The gasket may also include a distal portion opposite the proximal flange, the filtering material being secured to the distal portion of the gasket at a position where the distal portion has a diameter that is larger than the diameter of the opening.

In another aspect, a filter assembly for a reductant reservoir of an internal combustion engine system may include a filter material having a closed end that forms a distal end of the filter assembly and an open end provided opposite to the closed end. The filter assembly may also include a gasket secured to the filtering material, the gasket having a distal end portion connected to the open end of the filtering material, a proximal end portion including a flange that forms a proximal end of the filter assembly, and an intermediate portion extending between the proximal end portion and the distal end portion, the filtering material being secured to the distal end portion of the gasket at a location that has a diameter that is larger than a diameter of the intermediate portion.

In another aspect, a reductant storage system for an internal combustion engine system may include a storage container having a bottom wall, a top wall opposite the bottom wall, an opening extending through the top wall, and a reservoir formed by a hollow interior of the storage container and a header assembly including a heater and an inlet pipe, wherein a portion of the header assembly extends radially outward with respect to the opening. The reductant storage system may also include a filter assembly extending through the opening. The filter assembly may include a filtering material including a tubular body with a diameter larger than a diameter of the opening, a closed end, and an open end, and a gasket integrally formed with the filtering material, the gasket including a proximal flange that forms a proximal end of the filter assembly, the proximal flange having an outer diameter that is larger than the diameter of the opening and a sealing surface in sealing contact with the top wall of the storage container. The gasket may also include an intermediate portion that extends distally from the proximal flange, the intermediate portion having a cylindrical shape that extends through the opening into the reservoir, a transition portion that extends distally from the intermediate portion so as to define a gradually increasing inner diameter of the gasket, and a distal end portion that extends from the transition portion and that has an inner diameter that is larger than an inner diameter of the proximal flange, larger than the diameter of the opening, and larger than an inner diameter of the intermediate portion. The filter assembly may also include an attachment fixedly securing the filtering material to the gasket.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
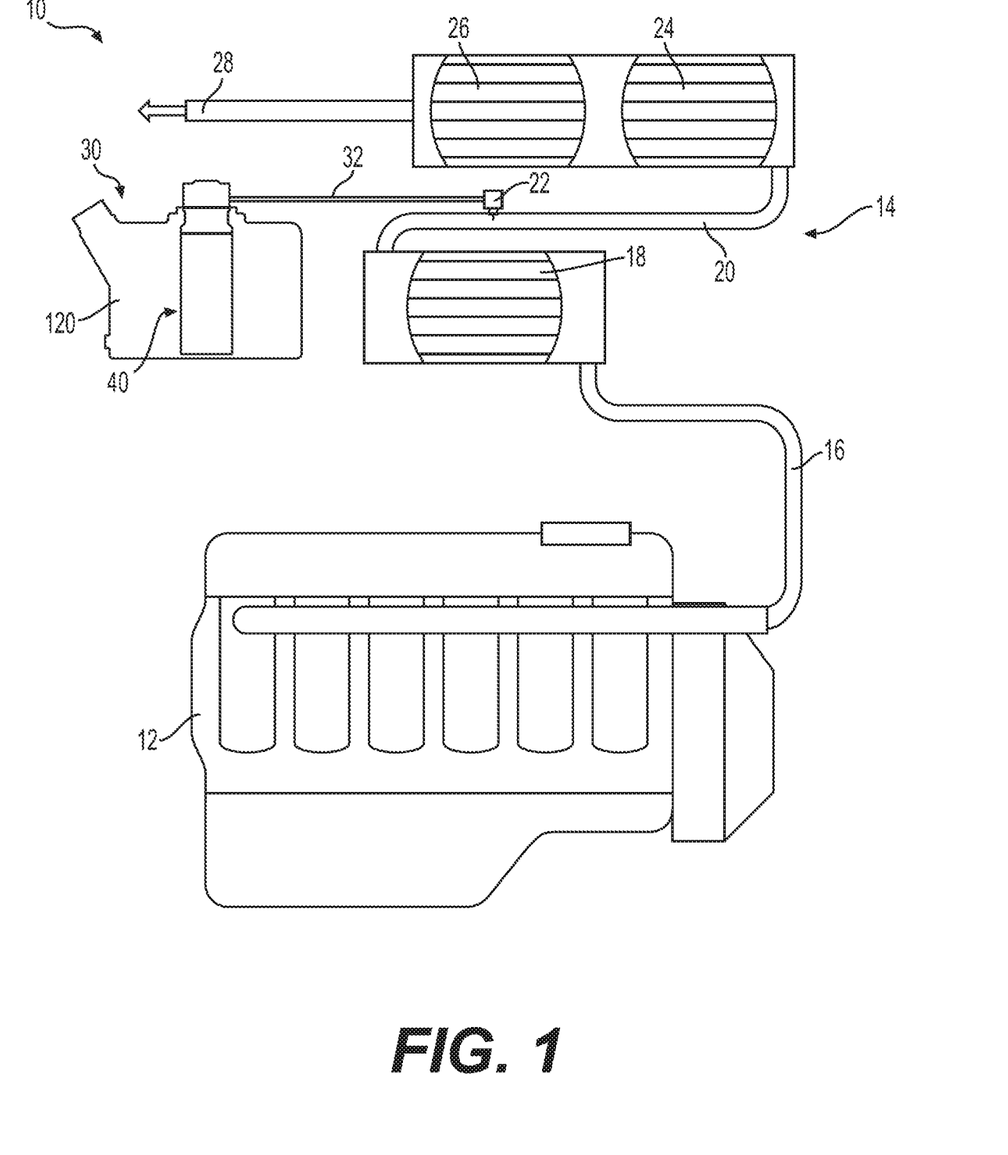
FIG. 1 is a schematic diagram illustrating an internal combustion engine system with a reductant storage system according to an aspect of the present disclosure.

FIG. 1 illustrates an internal combustion engine system 10 that may include an internal combustion engine 12 and an exhaust aftertreatment system 14 that receives and treats exhaust from internal combustion engine 12. While internal combustion engine 12 may be a diesel internal combustion engine, any suitable combustion engine for combusting liquid fuel (e.g., gasoline, diesel, etc.) or gaseous (e.g., natural gas) fuel may employed as internal combustion engine 12. Aftertreatment system 14 may include one or more aftertreatment devices 18, 24, 26 and one or more reductant (such as diesel exhaust fluid (DEF)) storage systems 30. Exemplary aftertreatment devices 18, 24, 26 include diesel oxidation catalysts, particulate filters, and selective catalytic reduction (SCR) catalysts. First aftertreatment device 18 may be connected downstream of internal combustion engine 12 via a first exhaust passage 16. Second and third aftertreatment devices 24, 26 may be in fluid communication with, and downstream of, first aftertreatment device 18 via a second exhaust passage 20. A third exhaust passage 28 may extend downstream of second and third aftertreatment devices 24, 26, and may include one or more suitable passages for guiding treated exhaust gas to an outlet. The first, second, and third aftertreatment devices 18, 24, 26 may be connected in series with respect to a path of exhaust produced by engine 12.

First aftertreatment device 18 of aftertreatment system 14 may include a particulate filter and may be connected to internal combustion engine 12 via first exhaust passage 16. However, first aftertreatment device 18 may include a diesel oxidation catalyst instead of, or in addition to, a particulate filter. A second exhaust passage 20 may be provided downstream of first aftertreatment device 18 and may extend to one or more additional aftertreatment devices, such as second aftertreatment device 24 and third aftertreatment device 26. Second aftertreatment device 24 may include an SCR catalyst. Third aftertreatment device 26 may include an oxidation catalyst such as an ammonia oxidation catalyst, or another suitable aftertreatment device. Third aftertreatment device 26 may be provided in a common housing with second aftertreatment device 24, as shown in FIG. 1, or may be provided in a separate housing.

Reductant storage system 30 may form a containment, filtering, and heating device for reductant that includes a storage container 120 and a filter assembly 40. Storage container 120 may be any suitable containment device that forms a reservoir for reductant. Filter assembly 40 may extend within storage container 120 and may provide a seal at an upper opening of storage container 120, as described below. Storage system 30 may be connected to second exhaust passage 20 via a reductant (DEF) injector 22 and a reductant (DEF) supply passage 32. Reductant injector 22 may be provided at a distal end of reductant supply passage 32 and secured to second exhaust passage 20. One or more reductant pumps (not shown) may be provided in reductant supply passage 32 to pump reductant from storage system 30 to reductant injector 22.

Figure 2:
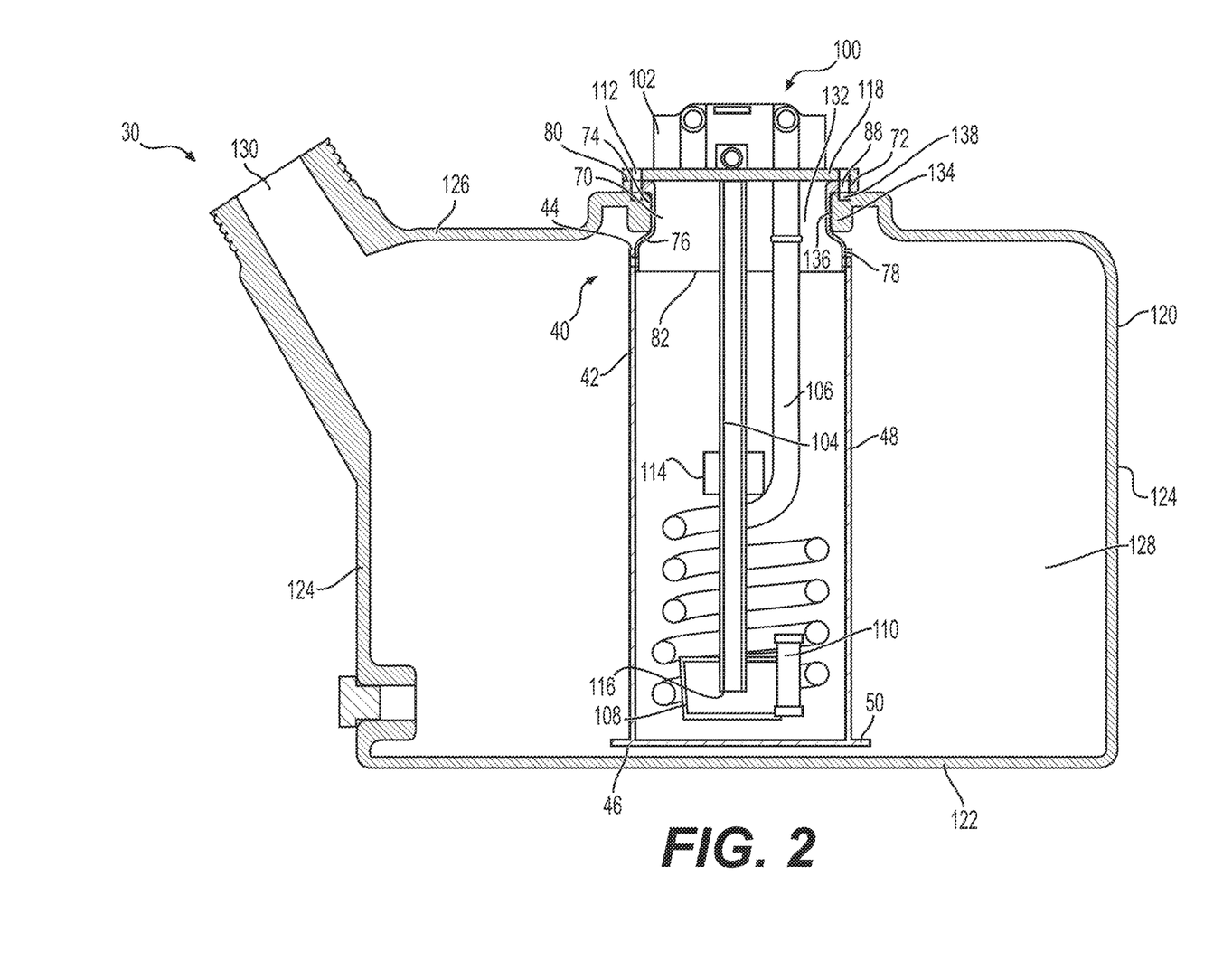
FIG. 2 is a cross-sectional view of the reductant storage system shown in FIG. 1.

FIG. 2 is a cross-sectional view illustrating reductant storage system 30, including filter assembly 40, a header assembly 100, and storage container 120 in an assembled state. Storage container 120 may include a bottom wall 122, side walls 124, and a top wall 126 that together define reservoir 128 for containing reductant such as DEF. When assembled, an upper or proximal end 80 of filter assembly 40 may extend outside of this reservoir 128 of container 120, while a distal or lower end 46 may extend within reservoir 128 to a position adjacent to bottom wall 122. Header assembly 100 may be removably fixed to the proximal end 80 and may include one or more components extending within reservoir 128.

Storage container 120 may have any appropriate shape, such as a fuel-can (rectangular) shape. Container 120 may include a filling opening 130 to receive reductant stored in reservoir 128, and may be sealed with a removable cap (not shown). Top wall 126 may include a header opening 132 sized to receive both filter assembly 40 and header assembly 100 which includes an assembly of components that extend within reservoir 128 to monitor, supply, and return reductant. Opening 132 may be defined and surrounded by a rim 134 formed as an embossed portion of top wall 126.

Filter assembly 40 may extend through opening 132 and within reservoir 128. Proximal end 80 of filter assembly 40 may include a gasket 70, while the remainder of filter assembly 40 may be formed by a filter or filtering material 42, which may form a bag-type filter. In one aspect, filtering material 42 and gasket 70 are formed integrally. Thus, proximal end 80 of filter assembly 40 may be formed by a proximal end of a gasket 70, and distal end 46 of filter assembly 40 may be formed by a distal end of filtering material 42.

Figure 3:
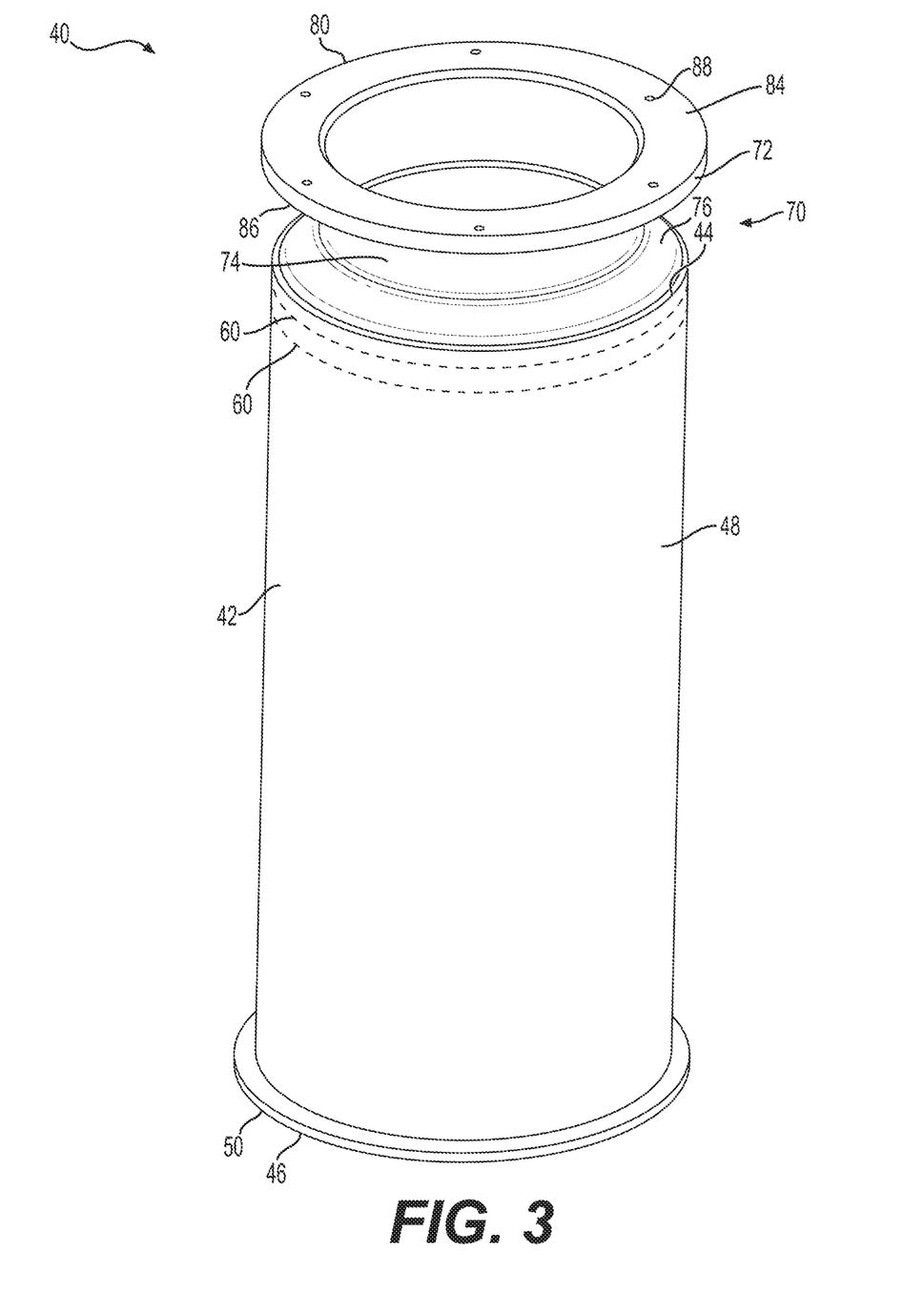
FIG. 3 is a perspective view of the filter assembly shown in FIG. 2.
Figure 4:
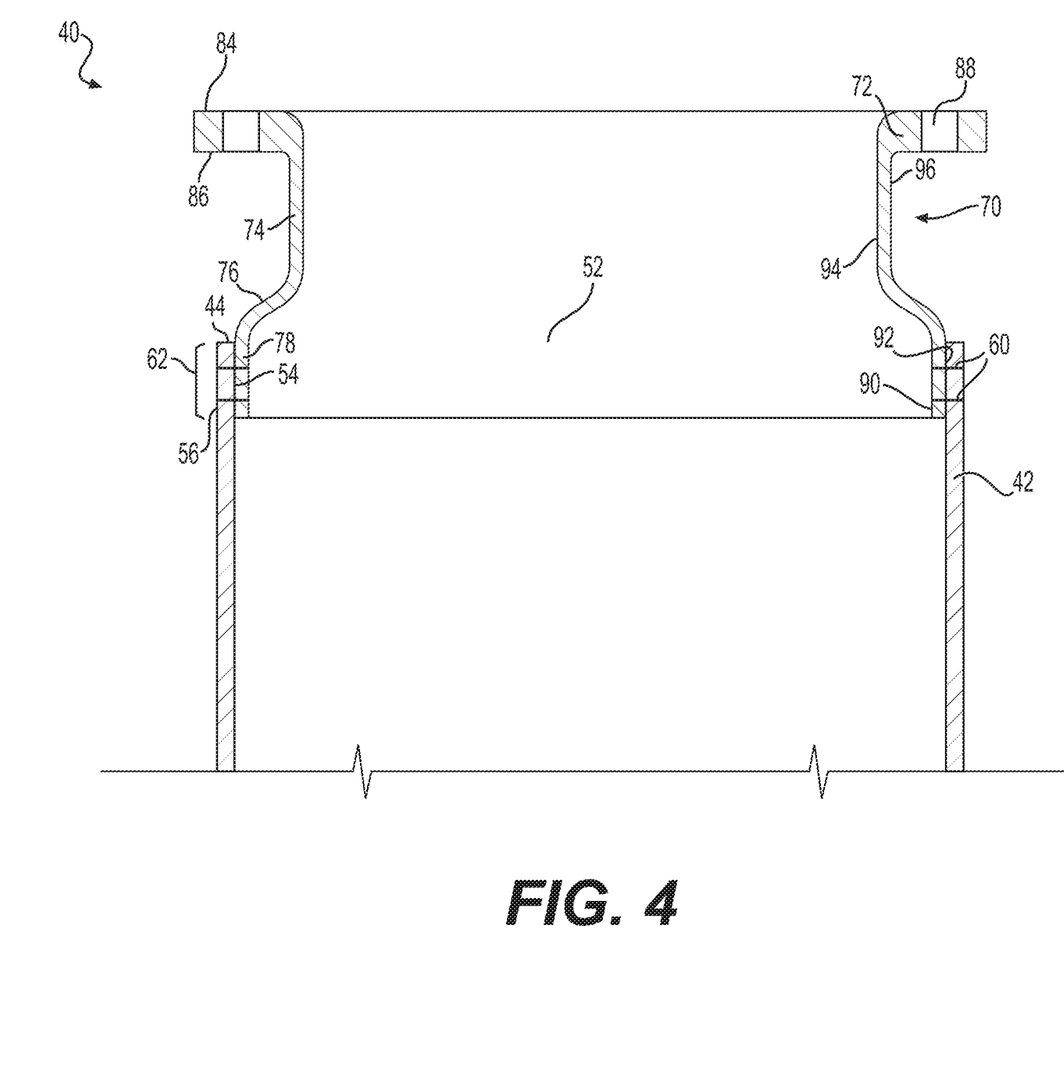
FIG. 4 is a cross-sectional view of a portion of the filter assembly of FIGS. 2 and 3.

As shown in FIGS. 2-4, gasket 70 may include a flange 72 that forms proximal end 80. Flange 72 may form a circumferentially-extending annular protrusion that has a sufficient width (in a proximal to distal or axial direction) and thickness (in a radial direction) to provide a seal. Flange 72 is larger (in diameter) than the opening 132 defined by rim 134 of container 120. An intermediate or cylindrical portion 74 of gasket 70 may extend in a distal direction from an inner circumferential periphery of flange 72. Cylindrical portion 74 may have a (radial) thickness of approximately 1 mm. and a diameter that is approximately the same as the diameter of opening 132. As can be seen in FIG. 2, the thickness of cylindrical portion 74 may be less than the thickness of flange 72. A transition portion 76 may extend from a distal end of cylindrical portion 74. Transition portion 76 may have an approximately skirt-shaped profile that gradually increases in diameter along the proximal to distal direction. Transition portion 76 may terminate at a radially-widened portion 78 that forms a distal portion of gasket 70. Widened portion 78 may have a diameter that is larger than the diameter of cylindrical portion 74, transition portion 76, and opening 132. A distal end of widened portion 78 may form a distal end 82 of gasket 70.

Gasket 70 may be formed of any appropriate sealing material, such as rubber. Other appropriate materials may include, for example, silicone, cork, felt, neoprene, nitrile rubber, and polymers (e.g., polytetrafluoroethylene or PTFE). Regardless of the material provided for gasket 70, gasket 70 may be configured as a compliant and/or foldable gasket. For example, at least transition portion 76 and widened portion 78 of gasket may be folded or compacted, without the use of tools, such that a diameter of portions 76 and 78 can be made smaller than a diameter of opening 132. Portions 76 and 78 may be sufficiently resilient so as to return to the shape shown in FIG. 2 upon release of folding or compressive force.

Filtering material 42 may have a generally cylindrical or tubular shape, including a tubular filter body 48 that has a diameter larger than a diameter of cylindrical portion 74 and opening 132. A proximal end 44 of filtering material 42 may form an open end or filter opening 52 (FIG. 4). The distal end 46 of filtering material 42 may form a closed end 50. Closed end 50 may be formed by fixing an approximately circular piece of filtering material to tubular filter body 48 by stitching, or by any suitable attachment mechanism described herein. Filtering material 42 may be formed of any appropriate filtering material, such as felt, that is freely permeable to reductant while blocking passage of contaminants, such as dirt, particulates, and other debris. Filter opening 52, tubular body 48, and closed end 46 may form an approximately cylindrical interior space that has a diameter larger than a diameter of opening 132. Filtering material 42 may be attached to gasket 70 by any suitable attachment mechanism, such as attachment material 60 described below and shown in FIGS. 3-5.

Filter assembly 40 may be secured to storage container 120 by the integral gasket 70 of filter assembly 40. For example, flange 72 of gasket 70 may include a plurality of attachment holes 88 through which a fastener, such as a screw, may be inserted. Rim 134 may include a matching plurality of attachment holes 138. When filter assembly 40 is inserted through opening 132, an inner circumferential surface 136 of rim 138 may be in contact with cylindrical portion 74. Transition portion 76 may extend distally beyond inner circumferential surface 136 of opening 132, and gradually extend radially outward with respect to opening 132 and inner circumferential surface 136.

Header assembly 100 may include a plurality of components that are received within reservoir 128 and within the interior of filter assembly 40. In addition to the components within reservoir 128, header assembly 100 may include a header 102 having a header flange 118 configured to cover opening 132 and close the open end of filter assembly 40 at flange 72. Header 102 may form a proximal end of header assembly 100 and may be removably securable (e.g., with bolts) to flange 72 via header attachment holes 112 that align with holes 88 and 138. Components of header assembly 100 that extend into reservoir 128 may include a reductant inlet pipe 104, heater 106, sump 108, and coarse filter 110. Header assembly 100 may also include one or more sensors, such as a level sensor 114, within reservoir 128. Header 102 may include an outlet in communication with reductant injector 22, as well as inlet and outlet passages to supply coolant for heater 106. For clarity, only one coolant passage is shown in FIG. 2.

When header assembly 100 is secured to storage container 120, reductant inlet pipe 104 may extend from header 102 to a sump 108 within a distal portion of reservoir 128. A distal end of reductant inlet pipe 104 may include an inlet opening 116 configured to draw reductant from within reservoir 128. Sump 108 may provide a boundary around inlet opening 116 so that reductant inlet pipe 104 is in communication with reservoir 128 via coarse filter 110. Coarse filter 110 may have a relatively coarse pore structure as compared to filtering material 42, and may be configured to prevent introduction of slush (partially-frozen reductant) to inlet pipe 104. Level sensor 114 may be a float-type level sensor slidably positioned on reductant inlet pipe 104, or on a separate supporting rod, and may be configured to detect a level of reductant. When header assembly 100 is secured to flange 72, reductant inlet pipe 104 may, sump 108, and coarse filter 110 may extend to a position adjacent to distal end 46 of filter assembly 40. One or more components of header assembly 100 within reservoir 128 (e.g., heater 106, sump 108, and/or coarse filter 110) may be sized and positioned so as to extend radially outward of opening 132. In the exemplary configuration shown in FIG. 2, a portion of heater 106 at the distal end of header assembly 100 may extend radially outward of (be radially larger than) opening 132. For example, one or more loops of heater 106 may include a portion that extends radially outward of opening 132. In the exemplary configuration shown in FIG. 2, two loops of heater 106 may extend outward of opening 132. If desired, one or more loops of heater 106 may be slightly larger than opening 132 and may be inserted through opening 132 by tilting the header assembly 100 during insertion. Thus, one or more of the components of header assembly 100 may extend radially outward of a portion of gasket 70, (e.g., cylindrical portion 74).

FIG. 3 is a perspective view of filter assembly 40, which may include a circumferentially-extending attachment surface 84 forming a proximal face of flange 72 that faces header flange 118. Attachment surface 84 may be shaped so as to mate with and seal with a distal-facing surface of header flange 118. The distal face of flange 72 may form a sealing surface 86 that is positioned on, and configured to form a seal with, a proximally-facing surface of rim 134. Thus, flange 72 may be sandwiched between, and in direct contact with, header flange 118 and rim 134 (FIG. 2). Attachment holes 88 may be provided in regularly-spaced intervals along the circumference of flange 72 and may be provided in any number sufficient to ensure that flange 72 forms a tight seal when header 102 and filter assembly 40 are assembled (e.g., with bolts) to container 120.

As described above, a distal end portion of gasket 70 may be secured to filtering material 42. FIG. 3 illustrates an exemplary attachment material 60 for securing filtering material 42 and gasket 70. Attachment material 60 may be formed by rings of stitching. While two exemplary rings of stitching are shown in FIG. 3, three or more rings of stitching may be used to provide a more robust connection. If desired, a single ring of stitching, or stitching in a differing pattern such as a reinforcing pattern, may be used to secure filtering material 42 and gasket 70. Additionally or alternatively, attachment material 60 may be formed by ultrasonically welding filtering material 42 and gasket 70, applying an adhesive, or any other suitable method. As shown in FIG. 3, attachment material 60 may be provided at a more than one location.

FIG. 4 is an enlarged cross-sectional view of filter assembly 40 illustrating the proximal portion of filtering material 42 and gasket 70. As seen in FIG. 4, attachment surface 84 and sealing surface 86 of gasket 70 may be opposed to each other along a proximal to distal direction. Cylindrical portion 74 may extend from sealing surface 86 so as to form an inner cylindrical surface 94 and an outer cylindrical surface 96. Outer cylindrical surface 96 may surround and enclose header opening 132, and may contact inner circumferential surface 136 of rim 134 (FIG. 2). Transition portion 76 may form a continuously-widening wall that extends distal of both gasket 72 and cylindrical portion 74, so as to bulge outward from cylindrical portion 74.

At a distal end of cylindrical portion 74, widened portion 78 may extend from the widest point of transition portion 76 and form a cylindrical shape. The widened portion 78 of gasket 70 may form an overlapping portion or overlap region 62 with filtering material 42. This overlap region 62 may extend distally within reservoir 128 (FIGS. 2 and 4). Widened portion 78 may include an inner widened surface 90 on an inner periphery, and an outer widened surface 92 on an outer periphery of portion 76. Similarly, filtering material 42 may include an inner surface 54 and an outer surface 56 at the open proximal end of filtering material 42. In the exemplary configuration shown in FIG. 4, outer widened surface 92 may be in contact with inner surface 54. Alternatively, by increasing the diameter of widened portion 78, inner widened surface 90 may instead be provided in contact with outer surface 56 of filtering material 42.

Attachment material 60 may be provided at one or more locations within overlap region 62. In the exemplary configuration of FIGS. 3 and 4, attachment material 60 is provided as a pair of rows of stitches within overlap region 62, and may also extend within reservoir 128. These stitches may extend through surfaces 54, 56, 90, and 92. When adhesive, ultrasonic welding, or similar attachment methods form attachment material 60, material 60 may be provided only between surfaces 54 and 92, or between surfaces 56 and 90 and may be formed by adhesive material, material of filtering material 42, and/or material of gasket 70.

Figure 5:
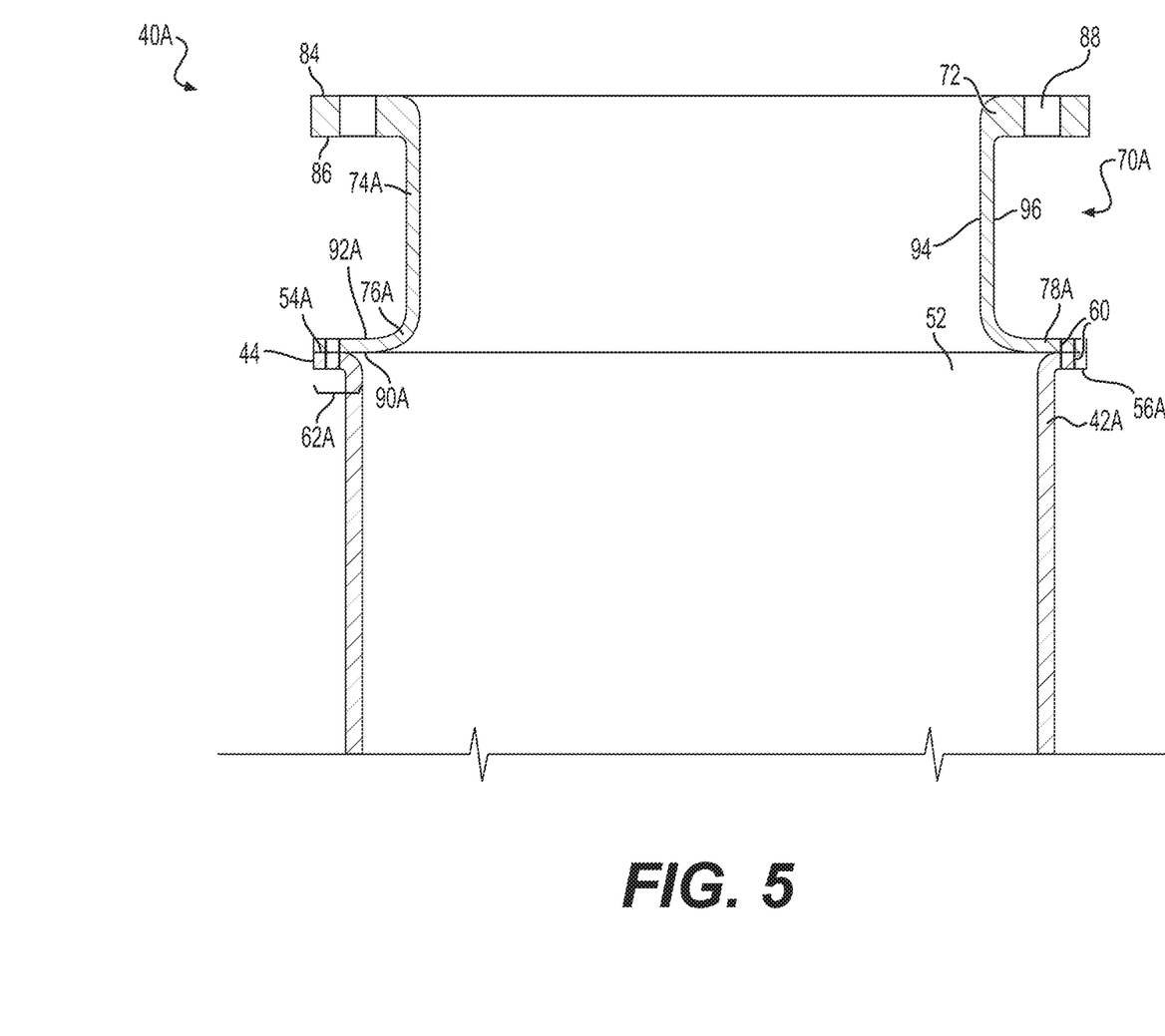
FIG. 5 is a cross-sectional view of an alternate configuration of the filter assembly of FIGS. 2 and 3.

FIG. 5 is an enlarged cross-sectional view of an alternate configuration for a filter assembly 40A including gasket 70A and filtering material 42A. Gasket 70A may include opposed attachment and sealing surfaces 84, 86 and a cylindrical portion 74A extending from sealing surface 86. A transition portion 76A may provide an outward-facing concave profile such that widened portion 78A includes a proximal-facing outer widened surface 92A and a distal-facing inner widened surface 90A. In this configuration, inner widened surface 90A may be in contact with an inner surface 54A of filtering material 42A and may provide widened portion 78A with an annular shape instead of the cylindrical shape of widened portion 78. Outer surface 56A of filtering material 42 may form a distal-facing surface at proximal end 44 of filtering material 42.

Overlap region 62A may be formed by the overlap between widened portion 78A and filtering material 42 where inner surface 54A contacts inner widened surface 90A. Attachment material 60 may be provided at one or more positions within overlap region 62A. When attachment material 60 is formed by stitching within overlap region 62A, these stitches may extend in an annular manner and may extend through surfaces 54A, 56A, 90A, and 92A in a proximal to distal direction. Alternatively or additionally, adhesive, ultrasonic welding, or similar attachment materials 60, may be provided only between surfaces 54A and 90A.

INDUSTRIAL APPLICABILITY

The disclosed aspects of reductant storage system 30 and filter assembly 40 may be employed in a variety of machines and/or vehicles. For example, reductant storage system 30 and filter assembly 40 may be included in any mobile or stationary vehicle or machine having an aftertreatment system with a fluid storage and supply system, such as a reductant storage and supply system. Reductant storage system 30 and filter assembly 40 may be configured to reduce NOx and CO emissions of any internal combustion engine by supplying a reductant such as DEF.

During the operation of internal combustion engine system 10, internal combustion engine 12 combusts fuel (e.g., diesel) and generates NOx-containing exhaust. Exhaust may exit engine 12 for treatment by aftertreatment system 14, in which aftertreatment devices 18, 24, 26 may reduce one or more undesired components from the exhaust. First exhaust passage 16 may provide a path for exhaust to flow from engine 12 to first aftertreatment device 18. Reductant may be drawn from inlet opening 116 (FIG. 2) to reductant supply passage 32 via a reductant pump, and supplied to reductant injector 22. Second exhaust passage 20 may receive exhaust from first aftertreatment device 18 and the reductant injected by injector 22. The exhaust and reductant may travel from second exhaust passage 20 to aftertreatment devices 24 and 26, at least one of which may include an SCR catalyst that reduces NOx via a reaction involving the catalyst and reductant. Exhaust may exit aftertreatment system 14 via third exhaust passage 28.

When operating under cold conditions (e.g., ambient temperatures near or below the freezing point of reductant such as DEF), engine coolant may travel between engine 12 and heater 106 of header assembly 100. Engine coolant may be warmed by heat created by engine 12. Thus, reductant may be warmed and/or melted an expeditious manner.

During installation of filter assembly 40 and header assembly 100 on storage container 120, filter assembly 40 may first be inserted through opening 132 of container 120 into reservoir 128. As an entirety of filtering material 42, including tubular filter body 48 and closed end 50, may be larger than opening 132, filtering material 42 may be folded or collapsed when passing filtering material 42 through opening 132. Transition portion 76 and widened portion 78 of gasket 70 may be folded or collapsed during insertion through opening 132, and may resiliently return to their original shapes when released.

Once filter assembly 40 is inserted and flange 72 rests on rim 134, a distal portion of header assembly 100 may be inserted into reservoir 128. During this insertion, header assembly 100 may be angled and rotated as the distal portion of header assembly 100 (e.g., a distal portion of heater 106) may extend outward of (be larger than) rim 132. Once the distal portion of header assembly 100 is inserted, the assembly 100 may be straightened and flange 118 may be brought into contact with flange 72. Attachment holes 88, 112, and 138 may be aligned with respect to each other, and fasteners such as bolts may be inserted and tightened to bring flange 72 into sealing contact with both rim 134 and header flange 118.

By providing a filter assembly 40 with an interior space that has a larger diameter than a header opening of a storage container, a high-capacity filtration mechanism may be provided to protect a reductant pump and reductant injector. Thus, even when debris is introduced to reservoir 128, such debris may be reliably prevented from interacting with sensitive equipment such as a senor, pump, or injector. By providing filtering material 42 with a diameter that is larger than the diameter of the header opening, larger header assemblies 100 may be used without the need to replace or redesign the storage container. Thus, header assembly 100 may be provided with enlarged heaters, and one or more additional sensors. By providing a foldable filter and gasket, the filter assembly may have a diameter that is larger than the opening in the container, providing increased area for receiving header components within the reservoir. By integrating the gasket with the filter material, the need to install a separate gasket between the header assembly and the filter may be eliminated, which may further increase available space for the insertion of header assembly components. Moreover, by providing an integral gasket and filter, reductant may only travel to a reductant inlet pipe 104 after passing through filter media, reducing the likelihood that debris reaches header assembly 100. The filter assembly 40 may be employed in various fluid storage systems in addition to systems employed to store reductant. For example, filter assembly 40 may be employed in a storage system for fuel, oil, coolant, or any other suitable fluid.

It will be apparent to those skilled in the art that various modifications and variations can be made to the disclosed apparatus and system without departing from the scope of the disclosure. Other embodiments of the apparatus and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A reductant storage system for an internal combustion engine system, comprising:
    a storage container having a bottom wall, a top wall opposite the bottom wall, an opening extending through the top wall, and a reservoir formed by a hollow interior of the storage container; and
    a filter assembly extending through the opening, the filter assembly including:
        a filtering material; and
        a gasket integrally formed with the filtering material, the gasket including:
            a proximal flange that has a diameter that is larger than the opening and including a sealing surface in sealing contact with the storage container; and
            a distal portion opposite the proximal flange, the filtering material being secured to the distal portion of the gasket at a position where the distal portion has a diameter that is larger than the diameter of the opening.

2. The reductant storage system of claim 1, wherein the top wall of the storage container includes a rim that surrounds the opening, the sealing surface being positioned on the rim.

3. The reductant storage system of claim 2, wherein the rim of the storage container is provided between the flange and the distal portion of the gasket.

4. The reductant storage system of claim 2, wherein the gasket includes a cylindrical portion extending from the flange, the cylindrical portion being encircled by the rim.

5. The reductant storage system of claim 4, wherein the gasket includes a transition portion extending into the reservoir, the transition portion being connected between the cylindrical portion and the distal portion, the transition portion having a gradually-increasing diameter.

6. The reductant storage system of claim 1, wherein a distal end portion of the filtering material of the filter assembly has a diameter that is larger than a diameter of the opening.

7. The reductant storage system of claim 2, wherein the distal portion extends within the reservoir and radially outside the rim.

8. The reductant storage system of claim 7, wherein the filter assembly includes an overlapping portion where the filtering material and gasket overlap each other, the overlapping portion including the distal portion of the gasket.

9. The reductant storage system of claim 1, further including a header assembly extending through the opening and inside the filter assembly, wherein the header assembly includes:
    a header flange in sealing contact with the proximal flange of the gasket;
    a heater; and
    an inlet separate from the opening.

10. The reductant storage system of claim 9, wherein the gasket is formed of a foldable material.

11. The reductant storage system of claim 10, wherein the foldable material includes rubber.

12. The reductant storage system of claim 1, wherein the gasket includes a transition portion that extends distally with respect to the proximal flange and proximally with respect to a distal end of the gasket so as to define an inner diameter of the gasket that continuously increases in a distal direction away from the proximal flange towards the distal end of the gasket.

13. A filter assembly for a reductant reservoir of an internal combustion engine system, the filter assembly comprising:
    a filtering material having:
        a closed end that forms a distal end of the filter assembly; and
        an open end provided opposite to the closed end; and
    a gasket secured to the filtering material, the gasket having a distal end portion connected to the open end of the filtering material, a proximal end portion including a flange that forms a proximal end of the filter assembly, and an intermediate portion extending between the proximal end portion and the distal end portion, the filtering material being secured to the distal end portion of the gasket at a location that has a diameter that is larger than a diameter of the intermediate portion.

14. The filter assembly of claim 13, wherein the gasket is integrally secured to a circumferential surface of the filtering material by one or more of stitching, ultrasonic welding, or an adhesive.

15. The filter assembly of claim 13, wherein the intermediate portion is connected to the distal end portion by a transition portion of the gasket between the intermediate portion and the distal end portion, the transition portion having a gradually-increasing diameter.

16. The filter assembly of claim 15, wherein the flange of the gasket includes a sealing circumferential surface that faces toward the proximal end portion.

17. The filter assembly of claim 13, wherein the gasket is formed of a foldable rubber material.

18. A reductant storage system for an internal combustion engine system, comprising:
    a storage container having a bottom wall, a top wall opposite the bottom wall, an opening extending through the top wall, and a reservoir formed by a hollow interior of the storage container;

a header assembly including a heater and an inlet pipe, wherein a portion of the header assembly extends radially outward with respect to the opening; and a filter assembly extending through the opening, the filter assembly including:

a filtering material including a tubular body with a diameter larger than a diameter of the opening, a closed end, and an open end;

a gasket integrally formed with the filtering material, the gasket including:

a proximal flange that forms a proximal end of the filter assembly, the proximal flange having an outer diameter that is larger than the diameter of the opening and a sealing surface in sealing contact with the top wall of the storage container;

an intermediate portion that extends distally from the proximal flange, the intermediate portion having a cylindrical shape that extends through the opening into the reservoir;

a transition portion that extends distally from the intermediate portion so as to define a gradually increasing inner diameter of the gasket; and a distal end portion that extends from the transition portion and that has an inner diameter that is larger than an inner diameter of the proximal flange, larger than the diameter of the opening, and larger than an inner diameter of the intermediate portion; and an attachment fixedly securing the filtering material directly to the distal end portion of the gasket such that a diameter of the filtering material at the gasket is larger than the inner diameter of the proximal flange and larger than the gradually increasing inner diameter of the intermediate portion of the gasket.

19. The reductant storage system of claim 18, wherein the attachment includes attachment material that extends within the reservoir.

\* \* \* \* \*